(12) United States Patent
Anselmo

(10) Patent No.: US 12,196,365 B1
(45) Date of Patent: Jan. 14, 2025

(54) STACKABLE MOUNTING BRACKET SYSTEM

(71) Applicant: Salvatore Anselmo, Rochester, NY (US)

(72) Inventor: Salvatore Anselmo, Rochester, NY (US)

( * ) Notice: Subject to any disclaimer, the term of this patent is extended or adjusted under 35 U.S.C. 154(b) by 0 days.

(21) Appl. No.: 18/903,795

(22) Filed: Oct. 1, 2024

(51) Int. Cl.
*F16M 13/02* (2006.01)
*F16B 2/08* (2006.01)
*H04Q 1/02* (2006.01)

(52) U.S. Cl.
CPC .............. *F16M 13/022* (2013.01); *F16B 2/08* (2013.01); *H04Q 1/09* (2013.01)

(58) Field of Classification Search
CPC ............ F16M 13/022; F16B 2/08; H04Q 1/09
USPC ................................................... 248/220.22
See application file for complete search history.

(56) References Cited

U.S. PATENT DOCUMENTS

| | | | | |
|---|---|---|---|---|
| 4,516,751 A | * | 5/1985 | Westbrook | F16M 13/02 248/920 |
| 8,714,502 B1 | * | 5/2014 | Davis | E04B 9/006 248/228.3 |
| 8,931,747 B2 | * | 1/2015 | Davis | F16M 13/02 248/228.3 |
| 11,644,147 B2 | * | 5/2023 | Anselmo | F16M 11/14 248/200 |
| 11,881,687 B2 | * | 1/2024 | Anderson | H02G 3/12 |
| 2019/0249824 A1 | * | 8/2019 | Floe | F16M 13/02 |
| 2023/0087857 A1 | * | 3/2023 | Anselmo | F16M 11/2078 248/200 |

\* cited by examiner

*Primary Examiner* — Todd M Epps
(74) *Attorney, Agent, or Firm* — Jong Patent Firm; Cheng Ning Jong; Tracy P. Jong

(57) ABSTRACT

A bracket system includes a bracket for supporting an object on a base, the bracket including a mounting plate for mounting the object, an elongated plate including two ends, a first of the two ends of the elongated plate is configured to be attached to the base about a first axis, and a support member including a first member and a second member, wherein the first member of the support member configured to be pivotably connected to a second of the two ends of the elongated plate about a second axis, the first member of the support member and the second member of the support member configured to be pivotably connected about a third axis, the second axis and the third axis are orthogonally disposed with respect to one another and the mounting plate is configured to be attached to the second member of the support member.

15 Claims, 13 Drawing Sheets

STACKABLE MOUNTING BRACKET SYSTEM

BACKGROUND OF THE INVENTION

1. The Field of the Invention

The present invention relates to a bracket system for mounting a device. More specifically, the present invention is directed to a bracket system for mounting a communication device to a pole where provisions for adjustments in horizontal and vertical planes are critical for the installation and functioning of the communication device.

2. Background Art

The rapid development in wireless communication technologies has required that radios, e.g., 5G and 4G radios, be mounted on utility poles to propagate communication signals to enable communities within the area of influence of the radios to utilize such technologies on their communication devices. Existing mounting brackets or bracket systems are complicated in their construction, include numerous parts and difficult and time-consuming to adjust in the field. Further, as the radios must service customers over a great number of years while disposed in sometimes harsh outdoor environments on poles or towers, it is imperative for the radios to continue to function properly over years. Therefore, the mounting brackets or bracket systems useful for supporting the radios must also survive the outdoor environments without degradations that can affect their ability to maintain the positioning and orientation of the radios. Yet further, an increasing number of communication devices are being added to utility poles by one or more companies and sometimes with multiple devices mounted on the same poles, it is important to ensure that newly added devices are not negatively impacting existing devices previously installed and already commissioned. Yet further, as it is typically beneficial to mount communication equipment at a level as high as possible on a pole due to benefits of line of sight communication, reduced interference, increased aesthetic and safety, e.g., reduced risk of collision with vehicles or pedestrians. It would additionally be beneficial to be able to stack mounting hardware to create a more compact arrangement of radios on each support pole.

There exists a need for a bracket or bracket system suitable for mounting a radio without undue effort, a bracket or bracket system that is also capable of immobilizing a radio even under high winds and snow loads to prevent degradation to radio signal qualities, a bracket or bracket system capable of a wide range of adjustments both vertically and horizontally during installation and a bracket or bracket system that provides a service lifespan which matches the service lifespan of at least the radio it supports. There also exists a need for a bracket or bracket system suitable for mounting multiple radios at roughly the same level on a pole to ease mounting of multiple radios on a common bracket or bracket system to reduce the amount of effort in mounting multiple radios and to reduce the footprint of the bracket or bracket system on the pole necessary to support multiple radios.

SUMMARY OF THE INVENTION

In accordance with the present invention, there is provided a bracket system includes a first bracket for supporting a first object on a base, the first bracket including:

(a) a first mounting plate for mounting the first object;
(b) a first elongated plate including two ends, a first of the two ends of the first elongated plate is configured to be attached to the base about a first axis; and
(c) a first support member including a first member and a second member, wherein the first member of the first support member configured to be pivotably connected to a second of the two ends of the first elongated plate about a second axis, the first member of the first support member and the second member of the first support member configured to be pivotably connected about a third axis, the second axis and the third axis are orthogonally disposed with respect to one another and the first mounting plate is configured to be attached to the second member of the first support member, wherein the position and orientation of the first object mounted on the first mounting plate are configured to be adjustable based on the orientation of the first elongated plate relative to the base about the first axis, the position of the base, the orientation of the first support member relative to the first elongated plate about the second axis and the orientation of the second member relative to the first member of the first support member about the third axis.

In one embodiment, the bracket system further includes a second bracket for supporting a second object on the base, the second bracket including:

(a) a second mounting plate for mounting the second object;
(b) a second elongated plate including two ends, a first of the two ends of the second elongated plate is configured to be attached to the base about the first axis with the second elongated plate disposed atop the first elongated plate; and
(c) a second support member including a first member and a second member, wherein the first member of the second support member configured to be pivotably connected to a second of the two ends of the second elongated plate about a fourth axis, the first member of the second support member and the second member of the second support member configured to be pivotably connected about a fifth axis, the fourth axis and the fifth axis are orthogonally disposed with respect to one another and the second mounting plate is configured to be attached to the second member of the second support member, wherein the position and orientation of the second object mounted on the second mounting plate are configured to be adjustable based on the orientation of the second elongated plate relative to the base about the first axis, the position of the base, the orientation of the second support member relative to the second elongated plate about the fourth axis and the orientation of the second member relative to the first member of the second support member about the fifth axis.

In one embodiment, the base includes:

(a) a block including at least one slot configured for receiving a band of a screw clamp; and
(b) a base plate including a hole, wherein the base plate is configured to be attached to the block, wherein the first elongated plate is pivotably connected to the base plate by securing a fastener through a hole disposed at the first of the two ends of the first elongated plate, the hole of the base plate, against the base plate and the block is secured to a pole by disposing the band of the screw clamp through the at least one slot and tightening the screw clamp.

In one embodiment, the base includes a base plate including a hole, the base plate disposed on one end of a pole and the first elongated plate is pivotably connected to the base plate by securing a fastener through a hole disposed at the first of the two ends of the first elongated plate, the hole of the base plate, against the base plate.

In one embodiment, the first member of the first support member further includes graduation marks and the second member of the first support member further includes a point configured to indicate an orientation of the first elongated member with respect to the first support member by aligning the point with a mark of the graduation marks. In one embodiment, the first elongated plate further includes a boss disposed on the second of the two ends of the first elongated plate.

In one embodiment, the first support member further includes a fastener, the first member of the first support member includes two support plates, the second member of the first support member includes two support plates, each of the two support plates of the first member includes a hole, each of the two support plates of the second member includes a slot, wherein the fastener is configured to be disposed through the slot of a first of the two support plates of the second member, the hole of a first of the two support plates of the first member, the hole of a second of the two support plates of the first member and a second of the two support plates of the second member to limit the adjustment of an orientation of the first member with respect to the second member to a path bound by the slots of the two support plates of the second member and to compress the two support plates of the second member against the two plates of the first member to immobilize rotation of the first member with respect to the second member about the third axis.

An object of the present invention is to provide a bracket/bracket system suitable for providing a communication device, such as a 5G or 4G, etc., radio, its necessary position and orientation while mounted on a pole.

Another object of the present invention is to provide a simple bracket/bracket system suitable for providing a communication device, such as a 5G or 4G, etc., radio, its necessary position and orientation while mounted on a pole.

Another object of the present invention is to provide a simple bracket/bracket system that is uncomplicated in its construction process and suitable for providing a communication device, such as a 5G or 4G, etc., radio, its necessary position and orientation while mounted on a pole.

Another object of the present invention is to provide a simple bracket/bracket system that is uncomplicated in its construction process and suitable to serve as a base to allow stacking of support arms to support communication devices, such as a 5G or 4G, etc., radios, their necessary positions and orientations while mounted on a pole.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—bracket system
4—bracket
6—base
8—base plate
10—elongated plate
12—support member
14—mounting plate
16—first member of support member
18—second member of support member
20—hole
22—slot
24—fastener
26—screw
28—nut
30—fastener
32—screw
34—nut
36—pole
38—supported object
40—block
42—fastener
44—fastener 46—hole of second end of elongated plate
48—thickness of elongated plate
50—length of bracket
52—distance between first axis and second axis
54—distance between second axis and mounting plate
56—width of base of elongated plate
58—width of arm of elongated plate
60—boss
62—graduation marks
64—point
66—band
68—fastener
70—screw
72—nut
74—hole
76—first axis
78—second axis or fourth axis
80—third axis or fifth axis
82—incline or pitch angle of mounting plate
84—hole of base plate
86—hole of support plates of first member of support member
88—support plates of first member of support member
90—support plates of second member of support member
92—hole
94—side walls connecting two support plates of first member of support member
96—fastener
98—loop

PARTICULAR ADVANTAGES OF THE INVENTION

The present bracket is capable of securing a 4G or 5G radio to a pole as it can withstand wind loads of up to about 190 mph wind and ice load of about 1 inch at 40 mph wind. The installation process of a radio with the present bracket is uncomplicated and not time-consuming while allowing one or more radios to be positioned and orientated as required by communication requirements. Multiple communication devices can be mounted at roughly the same level to a common base, simplifying the installation of multiple devices, using the present bracket on a pole. In one embodiment, the number of devices that can be mounted on a pole can be increased by providing one or more bases each capable of supporting more than one device as the elongated plates of the brackets for supporting the communication devices are stackable. As a single base is useful for supporting multiple communication devices, the installation of multiple communication devices at the same time or the addition of communication devices can be simplified as only one base that is already installed, is required.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
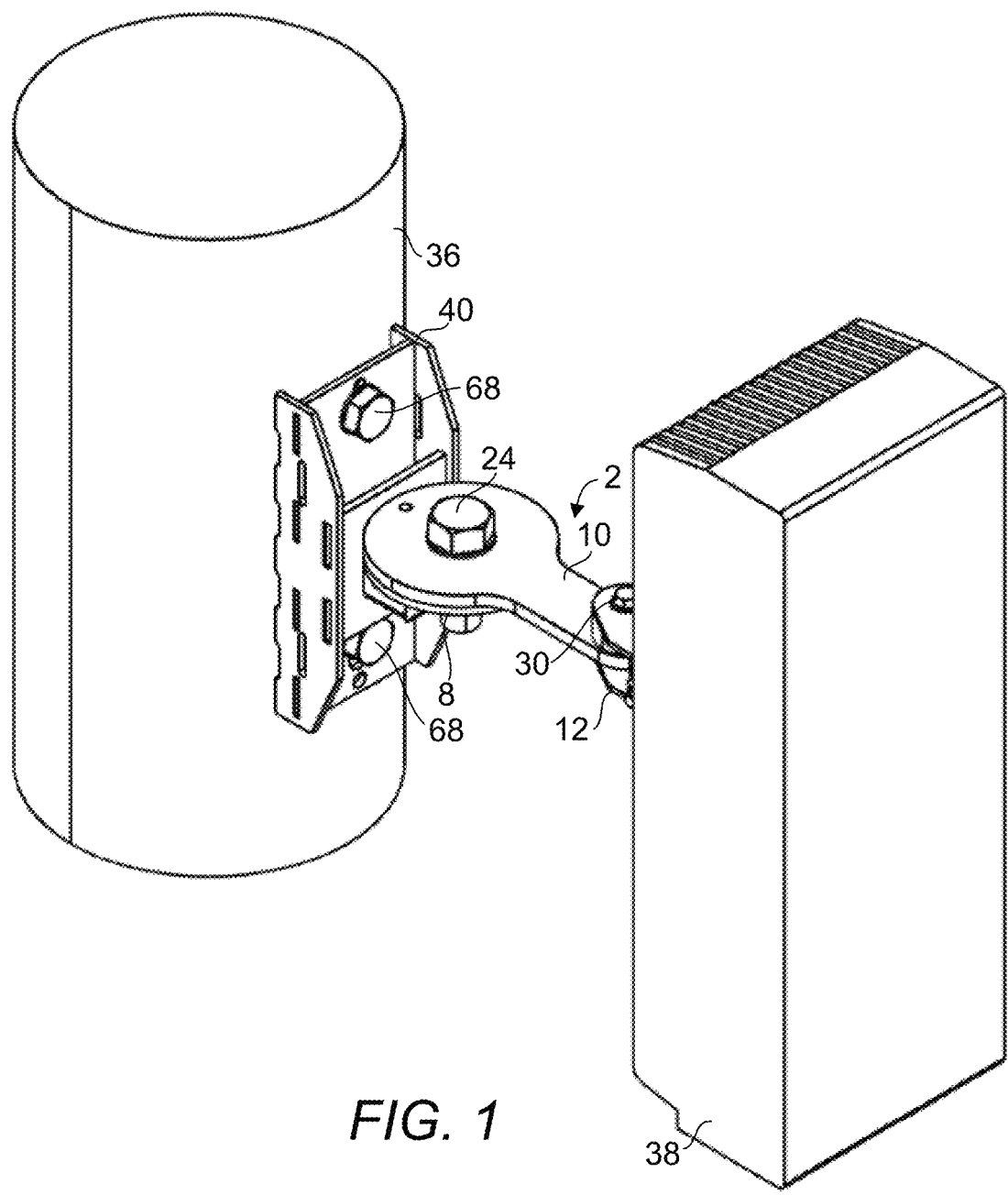
FIG. 1 is a top perspective view of an object supported on a pole using a bracket system.
Figure 2:
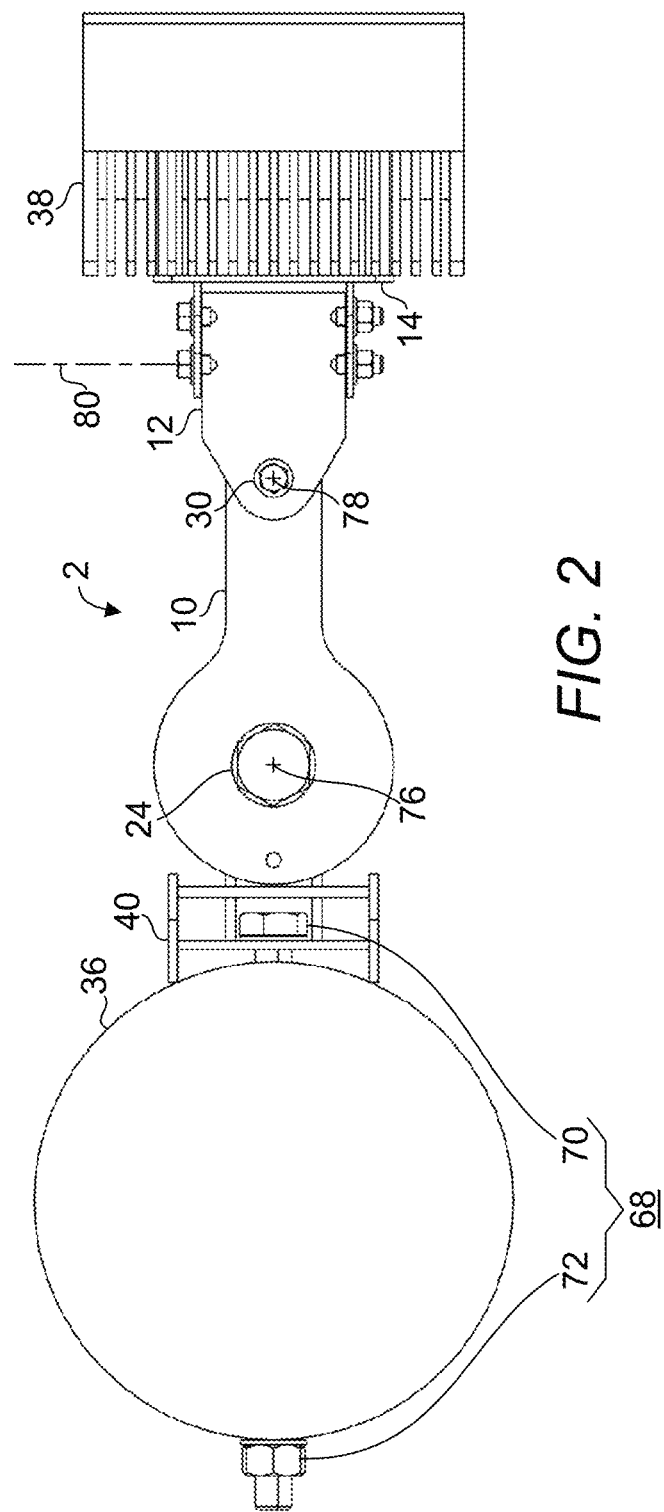
FIG. 2 is a top view of the supported object and the bracket system shown in FIG. 1.
Figure 3:
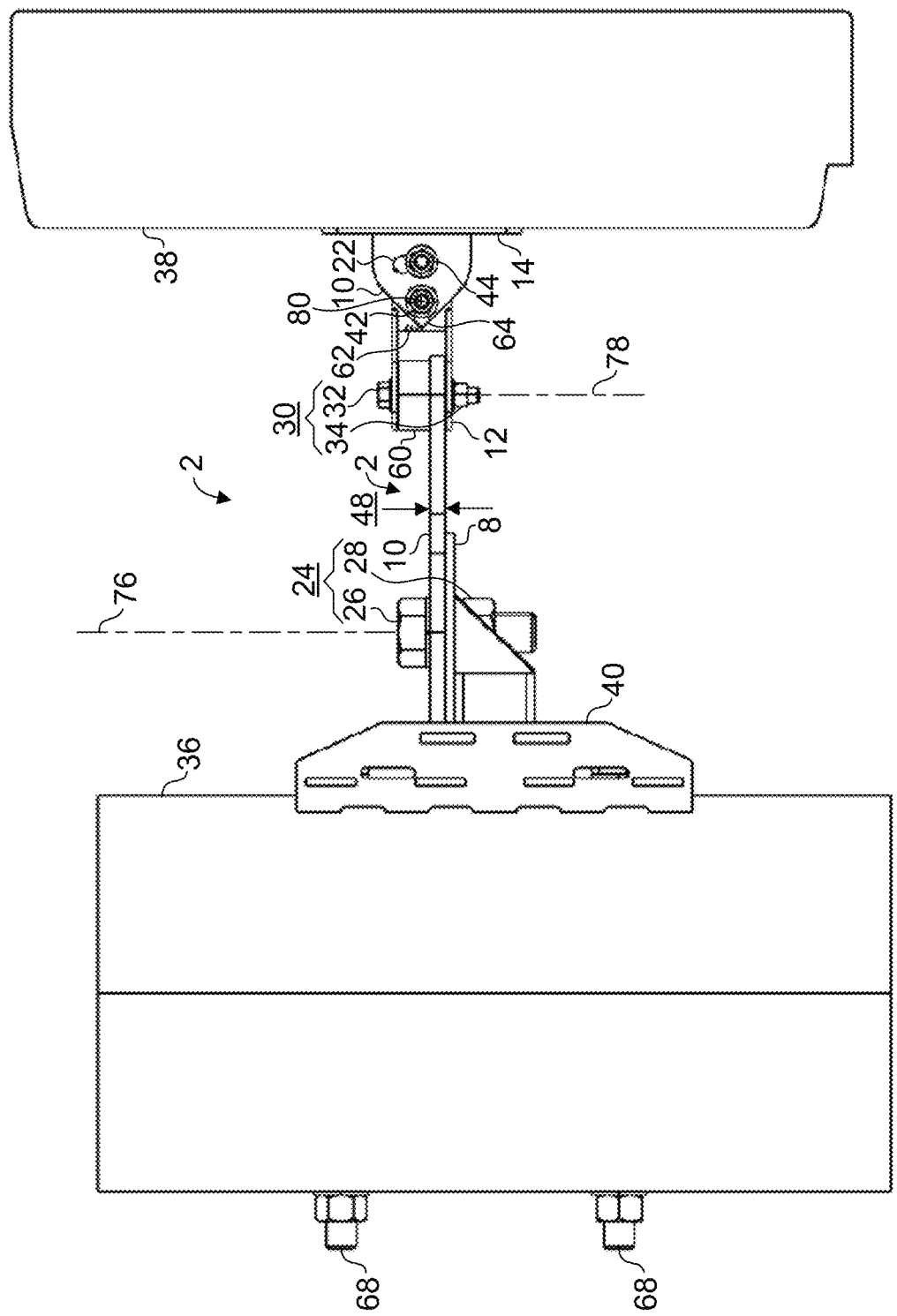
FIG. 3 is a side view of the supported object and the bracket system shown in FIG. 1.

FIG. 1 is a top perspective view of an object, e.g., radios, e.g., 5G and 4G radios, 38 supported on a pole 36 using a bracket system 2. FIG. 2 is a top view of the supported radio 38 and the bracket system 2 shown in FIG. 1. FIG. 3 is a side view of the supported radio 38 and the bracket system 2 shown in FIG. 1. As shown throughout herein, only a portion of the pole 36 is shown. A pole 36 to which a radio is attached can be a utility or a streetlight pole, often constructed from wood, steel or fiberglass, etc. The bracket system 2 includes a bracket 4 for supporting the radio 38 on a base 6. The bracket includes a mounting plate 14, an elongated plate 10 and a support member 12. The mounting plate 14 is useful for mounting the radio 38 by disposing fasteners 96 through holes 74 to secure the radio 38 to the mounting plate 14. The elongated plate 10 includes two ends, a first of the two ends of the elongated plate 10 is configured to be attached to the base 6 about a first axis 76. The support member 12 includes a first member 16 and a second member 18, wherein the first member 16 of the support member 12 is configured to be pivotably connected to a second of the two ends of the elongated plate 10 about a second axis 78. The first member 16 of the support member 12 and the second member 18 of the support member 12 is configured to be pivotably connected about a third axis 80. The second axis 78 and the third axis 80 are orthogonally disposed with respect to one another and the mounting plate 14 is configured to be attached to the second member 18 of the support member 12. In one example, the bracket is constructed from of hot-rolled steel and the thickness 48 of elongated plate 10 is about ¼-½ inches. At this thickness, the elongated plates 10 of multiple brackets can be stacked while still keeping the overall span of the stacked elongated plates compact, with each bracket supporting a radio.

The position and orientation of the radio 38 mounted on the mounting plate 14 are configured to be adjustable during installation of the radio 38 based on the orientation of the elongated plate 10 relative to the base 6 about the first axis 76, the position of the base 6, the orientation of the support member 12 relative to the elongated plate 10 about the second axis 78 and the orientation of the second member 18 relative to the first member 16 of the support member about the third axis 80. Upon finding a suitable orientation at the first axis 76, fastener 24 is used to secure the elongated plate 10 to the base 6 and upon finding a suitable orientation at the second axis 78, fastener 30 including screw 32 and nut 34, is used to secure the support member 12 to the elongated plate 10. Referring to FIG. 2, it shall be seen that the block 40 of the base 6 may be secured to the pole 36 using a fastener 68 by disposing a screw 70 through a hole 92 of block 40 and a hole drilled in the pole 36 and tightening a nut 72 on the screw 70 on the opposing side of the pole on which the base 6 is disposed.

Figure 4:
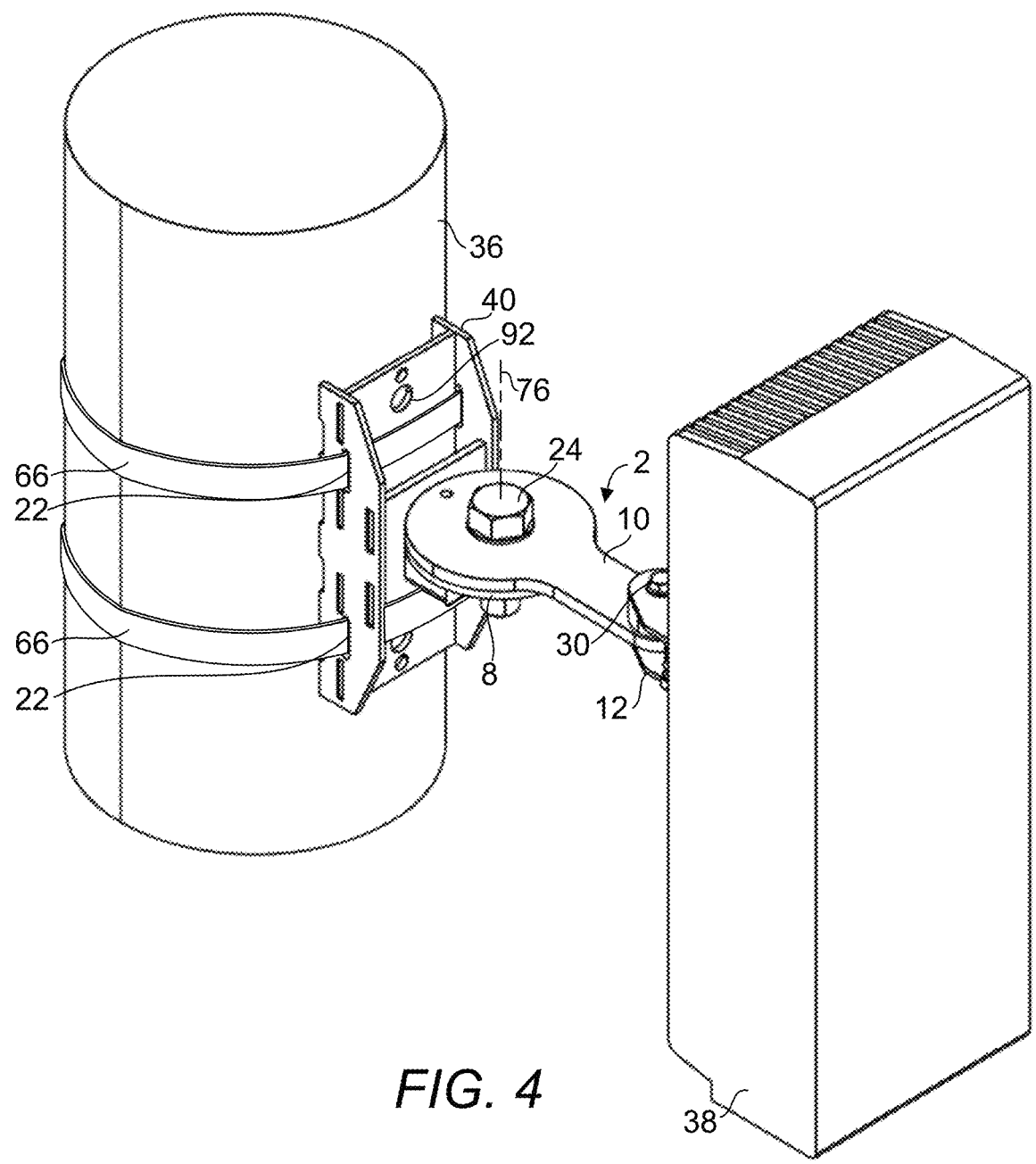
FIG. 4 is a top perspective view of an object supported on a pole using a bracket system that is secured to the pole using bands.
Figure 5:
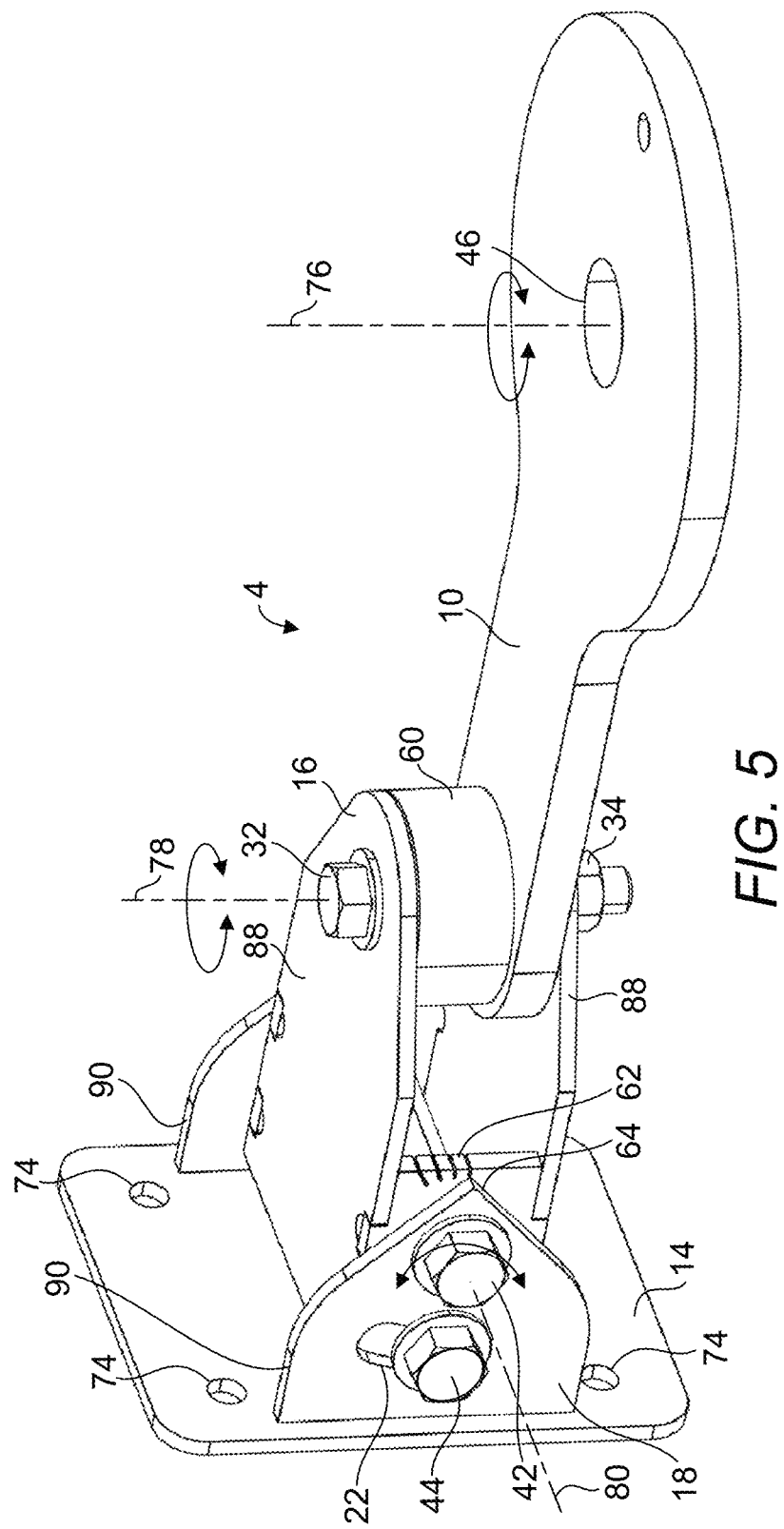
FIG. 5 is a top perspective close-up view of a bracket of FIGS. 1-4.
Figure 6:
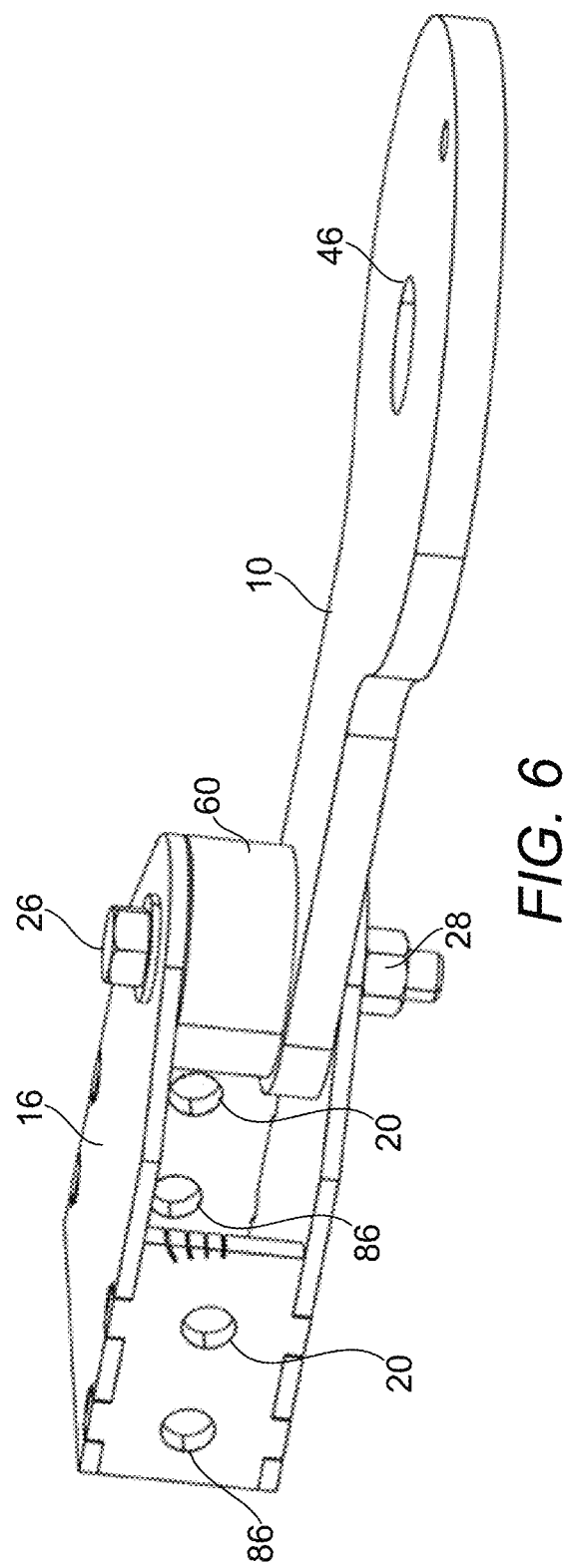
FIG. 6 is a top perspective view of the base shown in FIG. 5 with the support member removed therefrom.
Figure 7:
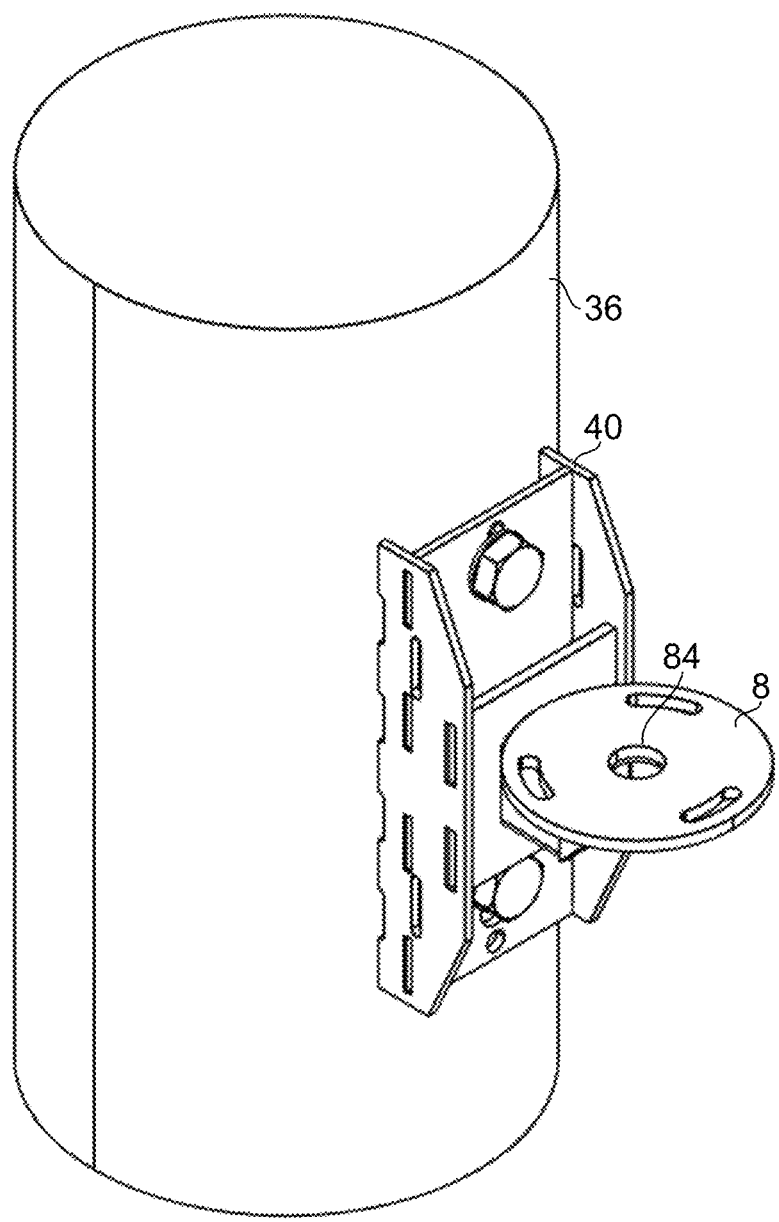
FIG. 7 is a top perspective view of a base for securing the bracket system of FIG. 4.

FIG. 4 is a top perspective view of a radio 38 supported on a pole 36 using a bracket system that is secured to the pole 36 using bands. FIG. 5 is a top perspective close-up view of a bracket of FIGS. 1-4. FIG. 6 is a top perspective view of the base shown in FIG. 5 with the support member removed therefrom. FIG. 7 is a top perspective view of a base 6 for securing the bracket system 2 of FIG. 4. In these examples, the base 6 includes a block 40 including at least one slot 22 configured for receiving a band or a band of a screw clamp 66 and a base plate 8 including a hole 84, wherein the base plate 8 is configured to be attached to the block 40. A screw clamp typically includes a band, constructed of, e.g., galvanized steel or stainless steel, into which a screw thread pattern that has been cut, pressed or otherwise formed. A screw clamp typically includes a captive screw disposed on one end of the band. In use, a screw clamp is placed around a pole to which a bracket system is to be attached with the loose end of the band fed into a narrow space between the band and the captive screw. The band is tightened around the pole by turning the screw in one direction. The elongated plate 10 is pivotably connected to the base plate 8 by securing a fastener 24 including a screw 26 through a hole 46 disposed at the first of the two ends of the elongated plate 10, the hole 84 of the base plate 8, against the base plate 8 with a nut 28 and the block 40 is secured to a pole 36 by disposing the band of the screw clamp 66 through the slots 22 disposed on the foot of the base 6 and tightening the screw clamp 66 around the pole 36. The base 6 includes a base plate 8 including a hole 84, the base plate 8 disposed on one end of a pole 36 and the elongated plate 10 is pivotably connected to the base plate 8 by securing a fastener through a hole 46 disposed at the first of the two ends of the elongated plate 10, the hole 84 of the base plate 8, against the base plate 8 to dispose the elongated plate 10 in a desired orientation or yaw angle with respect to the base 6. In the embodiment shown, the first member 16 of the support member 12 further includes graduation marks 62 and the second member 18 of the support member 12 further includes a point 64 configured to indicate an orientation or pitch angle 82 of the first elongated member 10 with respect to the support member 12 by aligning the point 64 with a mark of the graduation marks 62 to facilitate setting of a desired pitch angle of the object 38. In the embodiment shown, the elongated plate 10 further includes a boss 60 disposed on the second of the two ends of the elongated plate 10 to strengthen the joint of the elongated plate 10 and the support member 12.

The support member 12 further includes a fastener 44, the first member 16 of the support member includes two support plates 88, the second member of the support member 12 includes two support plates 90, each of the side walls 94 of the two support plates 88 of the first member includes a hole 86 and a hole 20, each of the two support plates 90 of the second member includes a slot 22, wherein the fastener 44 is configured to be disposed through the slot 22 of a first of the two support plates 90 of the second member, the hole 86 of a first of the two support plates 88 of the first member 16, the hole 86 of a second of the two support plates 88 of the first member 16 and a second of the two support plates 90 of the second member 18 to limit the adjustment of an orientation of the first member 16 with respect to the second member 18 to a path bound by the slots 22 of the two support plates 90 of the second member 18 and to compress the two support plates 90 of the second member 18 against the two plates 88 of the first member 16 to immobilize rotation of the first member 16 with respect to the second member 18 about the third axis 80 while providing a sufficient range for the pitch adjustment of the bracket to the radio 38 it supports. A fastener 42 is configured to be disposed through a first hole in a first of the two support plates 90 of the second member 18, a first hole 20 and a second hole 20 in two side walls 94 that connect the two support plates 88 of the first member 16 and a second hole in a second of the two support plates 90 of the second member 18.

Figure 8:
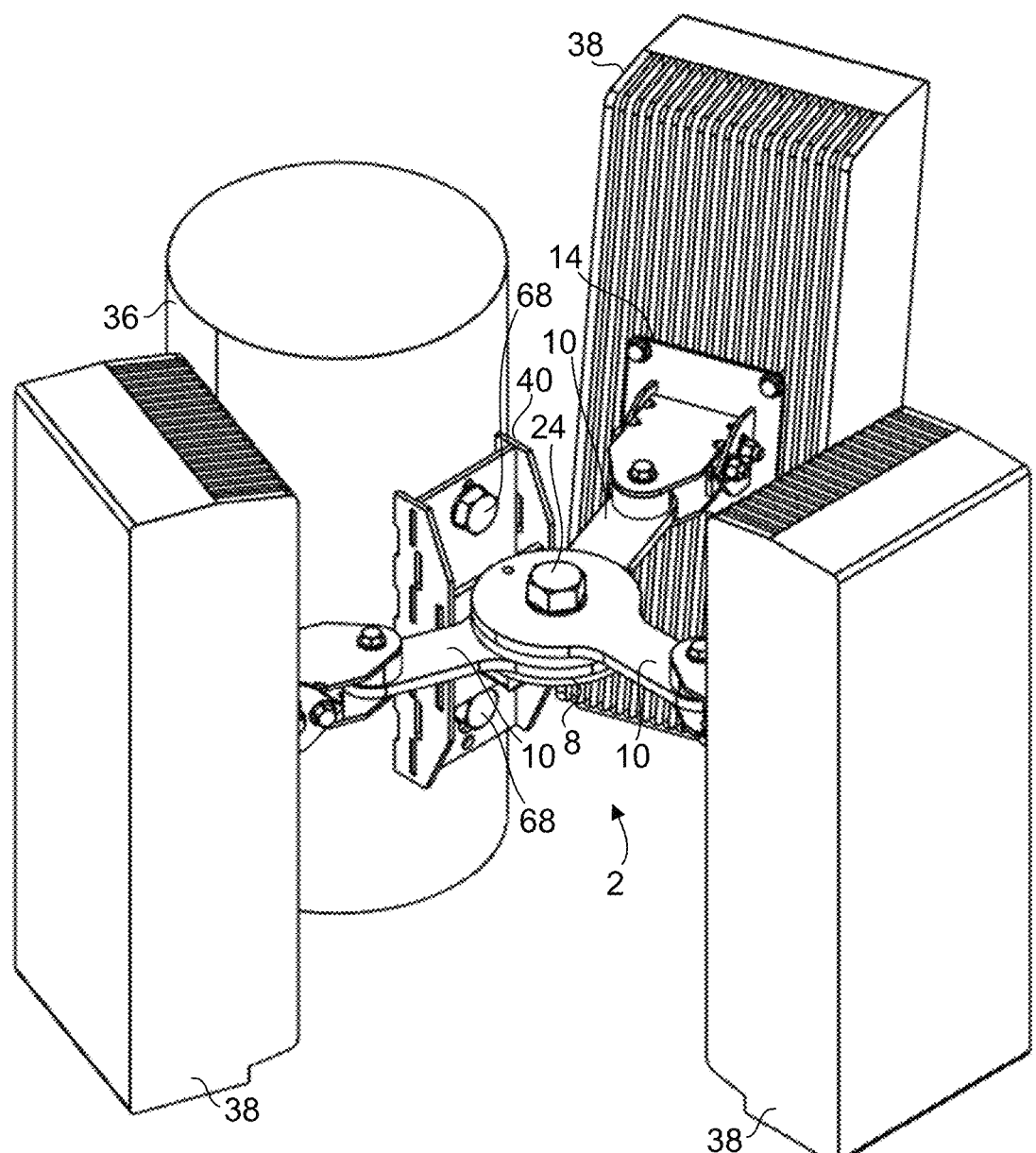
FIG. 8 is a top perspective view of several objects supported on a pole using a common base of a bracket system.

FIG. 8 is a top perspective view of several objects, e.g., radios 38 supported on a pole using a common base of a bracket system. It shall be noted that with a base 6 having a base plate 8 with a hole 84 disposed with its central axis substantially vertically, the base 6 is suitable for receiving elongated plates 10 stacked thereon as long as the radios 38 stacked thereon need not be disposed in the exactly the same positions or orientations or positions or orientations that would cause them to physically interfere with one another. In the example shown herein, the radio 38 to the left is mounted with a bracket system having its elongated plate 10 rotated to the left followed by an elongated plate 10 stacked thereon that is rotated to the right. Eventually, the elongated plate 10 stacked atop the elongated plates 10 of the other two bracket systems, is used to support a radio 38 disposed in an orientation different from the radios 38 supported on the other two elongated plates 10. A fastener 24 is then disposed through the holes 46 on one end of the elongated plates 10 and the hole 84 of the base plate 8 to secured to the base plate 8.

Figure 9:
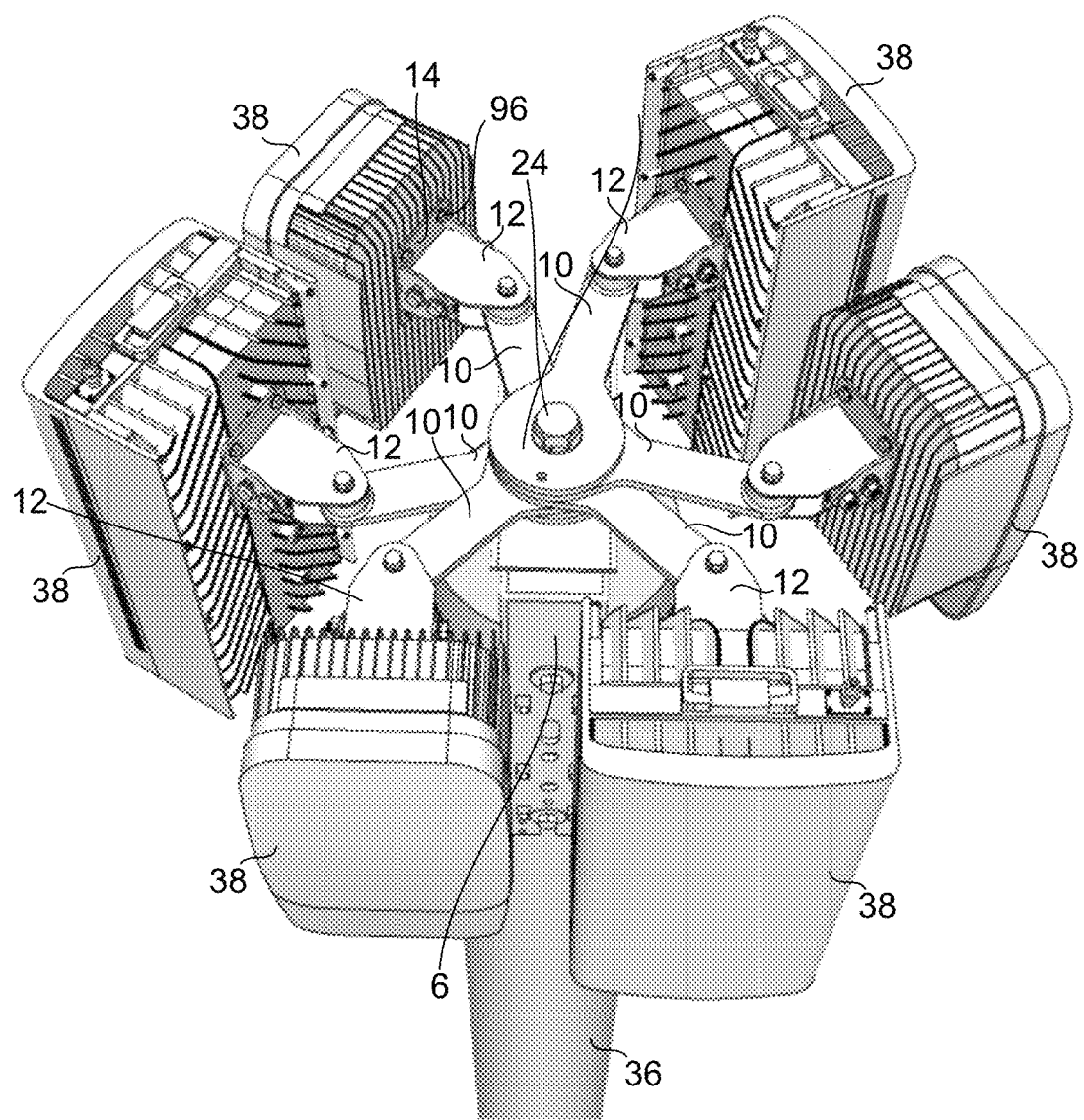
FIG. 9 is a top perspective view of several objects supported on the tip of a pole using a common base of a bracket system disposed on the tip of a pole.

FIG. 9 is a top perspective view of several objects 38 supported on the tip of a pole 36 using a common base 6 of a bracket system 2 disposed on the tip of a pole 36. Again, it shall be noted that multiple radios 38 may be mounted at roughly the same level, at a common base 6, removing the need for separately-available bases, making the task of mounting multiple radios 38 simpler while also reducing the footprint on the pole 36 for mounting the multiple radios 38.

Figure 10:
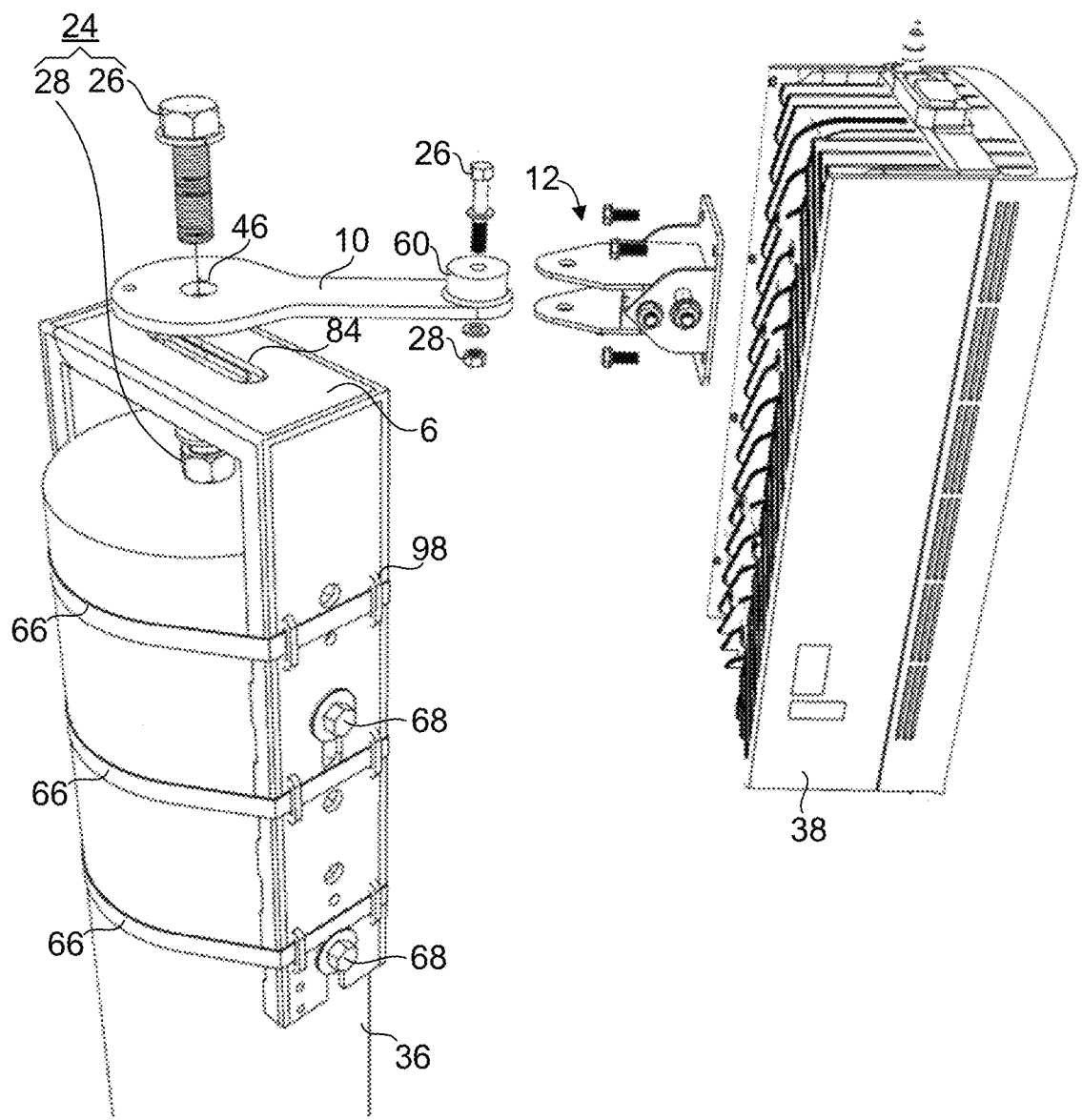
FIG. 10 is a top partial exploded view of a stackable bracket useful for securing an object from a base disposed on the tip of a pole.

FIG. 10 is a top partial exploded view of a stackable bracket useful for securing an object from a base disposed on the tip of a pole 36. It shall be noted that this embodiment is similar to the embodiment shown in FIG. 9 with the exception that the inverted L-shaped brackets that form the base 6, are secured to the pole 36 using bands 66 instead of fasteners 68. During installation, two inverted L-shaped brackets are oppositely disposed on the tip of a pole such that the holes 84, e.g., slots, disposed on the top segments of the inverted L-shaped brackets overlap to provide a hole through which a fastener 24 which can include a screw 26, a nut 28 and a washer, can be used to secure the present bracket to the base 6 as well as the top segments of the inverted L-shaped brackets themselves.

Figure 11:
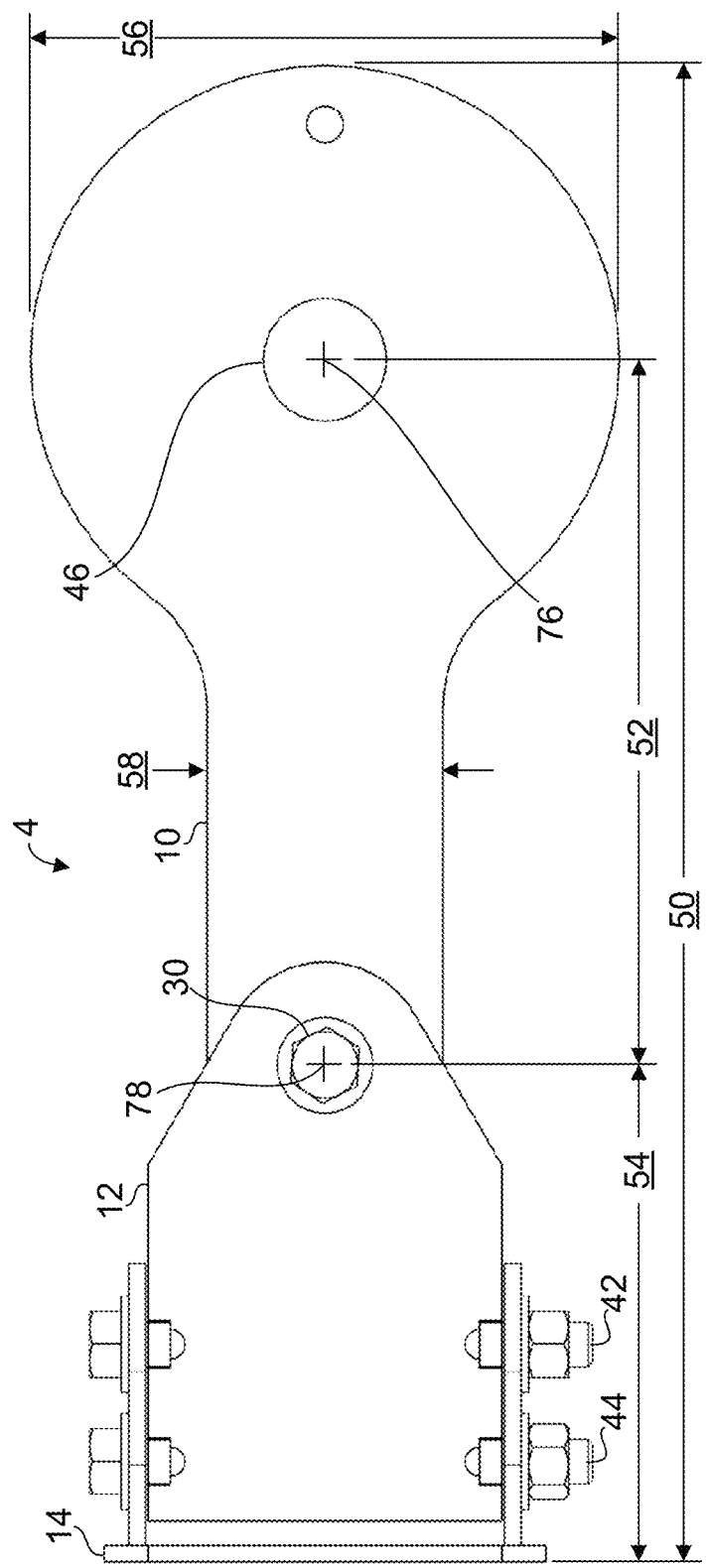
FIG. 11 is a top close-up view of a bracket having been removed from a base upon which the bracket is supported.
Figure 12:
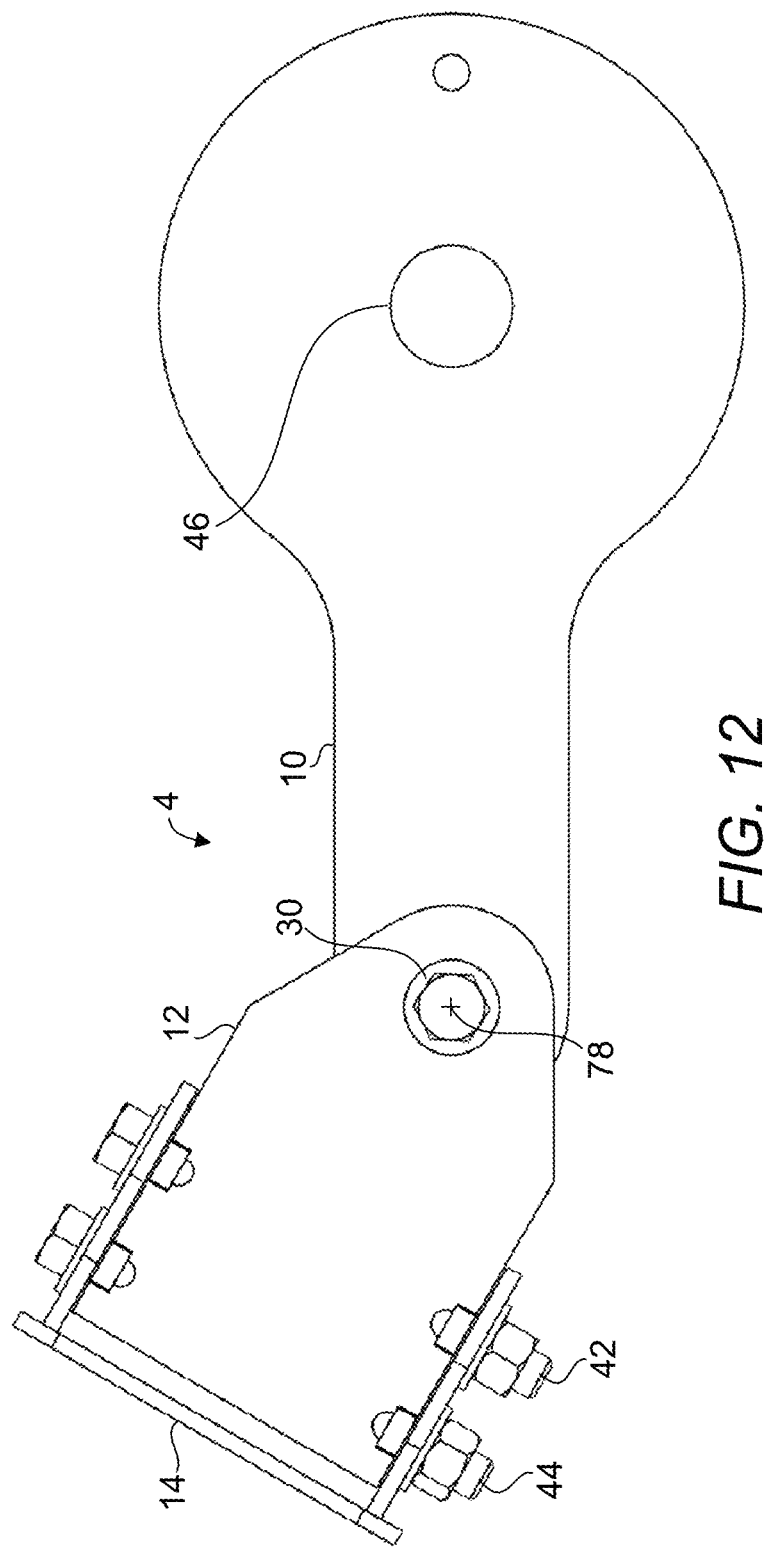
FIG. 12 is a top close-up view of a bracket having been removed from a base upon which the bracket is supported and the support member of the bracket system disposed at an orientation different from the orientation found in FIG. 11.

FIG. 11 is a top close-up view of a bracket having been removed from a base upon which the bracket is supported. In one example, the length 50 of bracket is about 14-16 inches, the distance 52 between the first axis 76 and second axis 78 is about 7-9 inches, the distance 54 between the second axis 78 and the mounting plate 14 is about 3.5-5.5 inches, the width 56 of the first end of the elongated plate 10 is about 4-6 inches and the width 58 of the second end of elongated plate 10 is about 1-3 inches. FIG. 12 is a top close-up view of a bracket having been removed from a base upon which the bracket is supported and the support member 12 of the bracket system disposed at an orientation different from the orientation found in FIG. 11. It shall be noted that, in addition to the orientation adjustment afforded by the first end of the elongated plate 10 about the first axis 76 at the base 6, the yaw adjustment of a radio 38 mounted on the mounting plate 14 is also possible through the adjustment of the support member 12 at the second axis 78.

Figure 13:
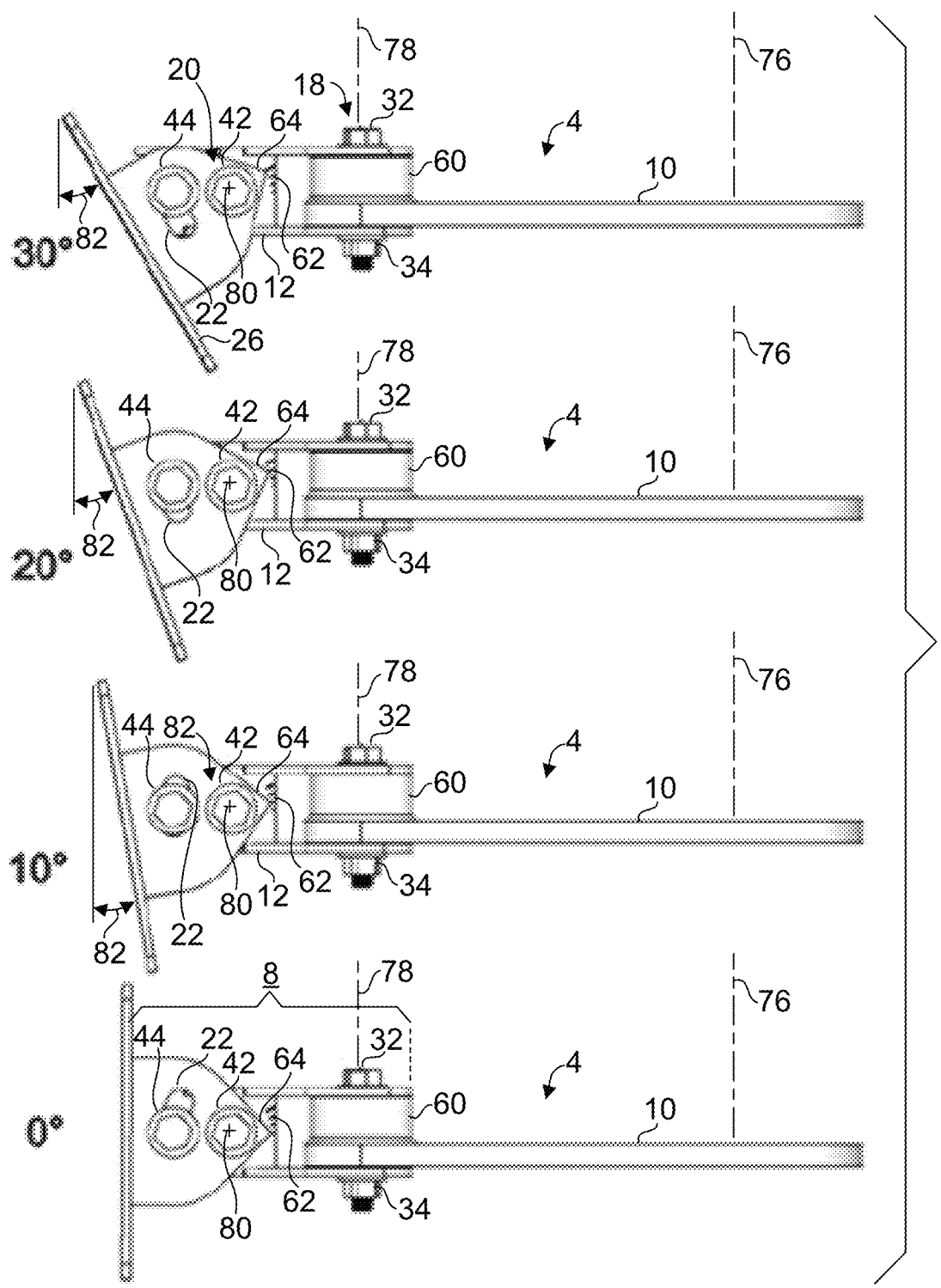
FIG. 13 is a series of diagrams depicting the mounting plate of a present bracket system being disposed at various orientations.

FIG. 13 is a series of diagrams depicting the mounting plate 14 of a present bracket system being disposed at various orientations or pitch angle of 0, 10, 20 and 30 degrees as indicated by the respective graduation mark 62, providing sufficient range for pitch adjustment to an object supported on the mounting plate 14 while limiting the range of pitch that the object can have should the second member 18 of the support member 12 fail to be secured against the first member 16 of the support member 12, e.g., due to inadvertent loosening of fastener 44 during use.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A bracket system comprises a first bracket for supporting a first object on a base, said first bracket comprising:
   (a) a first mounting plate for mounting the first object;
   (b) a first elongated plate comprising two ends, a first of said two ends of said first elongated plate is configured to be attached to the base about a first axis; and
   (c) a first support member comprising a first member and a second member, wherein said first member of said first support member configured to be pivotally connected to a second of said two ends of said first elongated plate about a second axis, said first member of said first support member and said second member of said first support member configured to be pivotably connected about a third axis, said second axis and said third axis are orthogonally disposed with respect to one another and said first mounting plate is configured to be attached to said second member of said first support member,
   wherein a position and orientation of the first object mounted on said first mounting plate are configured to be adjustable based on the orientation of said first elongated plate relative to the base about said first axis, the position of the base, the orientation of said first support member relative to said first elongated plate about said second axis and the orientation of said second member relative to said first member of said first support member about said third axis.

2. The bracket system of claim 1, further comprising a second bracket for supporting a second object on the base, said second bracket comprising:
   (a) a second mounting plate for mounting the second object;
   (b) a second elongated plate comprising two ends, a first of said two ends of said second elongated plate is configured to be attached to the base about said first axis with said second elongated plate disposed atop said first elongated plate; and
   (c) a second support member comprising a first member and a second member, wherein said first member of said second support member configured to be pivotally connected to a second of said two ends of said second elongated plate about a fourth axis, said first member of said second support member and second member of said second support member configured to be pivotably connected about a fifth axis, said fourth axis and said fifth axis are orthogonally disposed with respect to one another and said second mounting plate is configured to be attached to said second member of said second support member,
   wherein the position and orientation of the second object mounted on said second mounting plate are configured to be adjustable based on the orientation of said second elongated plate relative to the base about said first axis, the position of the base, the orientation of said second support member relative to said second elongated plate about said fourth axis and the orientation of said second member relative to said first member of said second support member about said fifth axis.

3. The bracket system of claim 1, wherein the base comprises:
   (a) a block comprising at least one slot configured for receiving a band of the screw clamp; and
   (b) a base plate comprising a hole, wherein said base plate is configured to be attached to said block,
   wherein said first elongated plate is pivotably connected to said base plate by securing a fastener through a hole disposed at said first of said two ends of said first elongated plate, said hole of said base plate, against said base plate and said block is secured to a pole by disposing the band of the screw clamp through said at least one slot and tightening the screw clamp.

4. The bracket system of claim 1, wherein the base comprises a base plate comprising a hole, said base plate disposed on one end of a pole and said first elongated plate is pivotably connected to said base plate by securing a fastener through a hole disposed at said first of said two ends of said first elongated plate, said hole of said base plate, against said base plate.

5. The bracket system of claim 1, wherein said first member of said first support member further comprises graduation marks and said second member of said first support member further comprises a point configured to indicate an orientation of said first elongated member with respect to said first support member by aligning said point with a mark of said graduation marks.

6. The bracket system of claim 1, wherein said first elongated plate further comprises a boss disposed on said second of said two ends of said first elongated plate.

7. The bracket system of claim 1, wherein said first support member further comprises a fastener, said first member of said first support member comprises two support plates, said second member of said first support member comprises two support plates, each of said two support plates of said first member comprises a hole, each of said two support plates of said second member comprises a slot, wherein said fastener is configured to be disposed through said slot of a first of said two support plates of said second member, said hole of a first of said two support plates of said first member, said hole of a second of said two support plates of said first member and a second of said two support plates of said second member to limit the adjustment of an orientation of said first member with respect to said second member to a path bound by said slots of said two support plates of said second member and to compress said two support plates of said second member against said two plates of said first member to immobilize rotation of said first member with respect to said second member about said third axis.

8. The bracket system of claim 1, wherein said first elongated plate comprises a thickness of ¼-½ inches.

9. A bracket system comprises a first bracket for supporting a first object on a base, said first bracket comprising:
(a) a first mounting plate for mounting the first object;
(b) a first elongated plate comprising two ends, a first of said two ends of said first elongated plate is configured to be attached to the base about a first axis; and
(c) a first support member comprising a first member and a second member, wherein said first member of said first support member configured to be pivotably connected to a second of said two ends of said first elongated plate about a second axis, said first member of said first support member and said second member of said first support member configured to be pivotably connected about a third axis, said second axis and said third axis are orthogonally disposed with respect to one another and said first mounting plate is configured to be attached to said second member of said first support member,
wherein a position and orientation of the first object mounted on said first mounting plate are configured to be adjustable based on the orientation of said first elongated plate relative to the base about said first axis, the position of the base, the orientation of said first support member relative to said first elongated plate about said second axis and the orientation of said second member relative to said first member of said first support member about said third axis and said first member of said first support member further comprises graduation marks and said second member of said first support member further comprises a point configured to indicate an orientation of said first elongated member with respect to said first support member by aligning said point with a mark of said graduation marks.

10. The bracket system of claim 9, further comprising a second bracket for supporting a second object on the base, said second bracket comprising:
(a) a second mounting plate for mounting the second object;
(b) a second elongated plate comprising two ends, a first of said two ends of said second elongated plate is configured to be attached to the base about said first axis with said second elongated plate disposed atop said first elongated plate; and
(c) a second support member comprising a first member and a second member, wherein said first member of said second support member configured to be pivotably connected to a second of said two ends of said second elongated plate about a fourth axis, said first member of said second support member and said second member of said second support member configured to be pivotably connected about a fifth axis, said fourth axis and said fifth axis are orthogonally disposed with respect to one another and said second mounting plate is configured to be attached to said second member of said second support member, wherein the position and orientation of the second object mounted on said second mounting plate are configured to be adjustable based on the orientation of said second elongated plate relative to the base about said first axis, the position of the base, the orientation of said second support member relative to said second elongated plate about said fourth axis and the orientation of said second member relative to said first member of said second support member about said fifth axis.

11. The bracket system of claim 9, wherein the base comprises:
(a) a block comprising at least one slot configured for receiving a band of a screw clamp; and
(b) a base plate comprising a hole, wherein said base plate is configured to be attached to said block,
wherein said first elongated plate is pivotably connected to said base plate by securing a fastener through a hole disposed at said first of said two ends of said first elongated plate, said hole of said base plate, against said base plate and said block is secured to a pole by disposing the band of the screw clamp through said at least one slot and tightening the screw clamp.

12. The bracket system of claim 9, wherein the base comprises a base plate comprising a hole, said base plate disposed on one end of a pole and said first elongated plate is pivotably connected to said base plate by securing a fastener through a hole disposed at said first of said two ends of said first elongated plate, said hole of said base plate, against said base plate.

13. The bracket system of claim 9, wherein said first elongated plate further comprises a boss disposed on said second of said two ends of said first elongated plate.

14. The bracket system of claim 9, wherein said first support member further comprises a fastener, said first member of said first support member comprises two support plates, said second member of said first support member comprises two support plates, each of said two support plates of said first member comprises a hole, each of said two support plates of said second member comprises a slot, wherein said fastener is configured to be disposed through said slot of a first of said two support plates of said second member, said hole of a first of said two support plates of said first member, said hole of a second of said two support plates of said first member and a second of said two support plates of said second member to limit the adjustment of an orientation of said first member with respect to said second member to a path bound by said slots of said two support plates of said second member and to compress said two support plates of said second member against said two plates of said first member to immobilize rotation of said first member with respect to said second member about said third axis.

15. The bracket system of claim 9, wherein said first elongated plate comprises a thickness of ¼-½ inches.

* * * * *